(12) United States Patent
Hanson et al.

(10) Patent No.: US 7,918,501 B1
(45) Date of Patent: Apr. 5, 2011

(54) VEHICLE SAFETY SEAT

(76) Inventors: Dennis Hawkins Hanson, Round Lake Beach, IL (US); Jennifer Lynn Hanson, Round Lake Beach, IL (US)

( * ) Notice: Subject to any disclaimer, the term of this patent is extended or adjusted under 35 U.S.C. 154(b) by 0 days.

(21) Appl. No.: 12/218,662

(22) Filed: Jul. 17, 2008

Related U.S. Application Data

(60) Provisional application No. 60/961,024, filed on Jul. 18, 2007.

(51) Int. Cl.
*B60N 2/42* (2006.01)
(52) U.S. Cl. .................................................. 297/216.2
(58) Field of Classification Search ............ 297/216.19, 297/216.2, 216.1, 216.16, 216.17, 216.18, 297/216.15, 216.11, 344.14
See application file for complete search history.

(56) References Cited

U.S. PATENT DOCUMENTS

| | | | | |
|---|---|---|---|---|
| 3,998,291 A | * | 12/1976 | Davis | 180/274 |
| 4,781,414 A | * | 11/1988 | Periou | 297/313 |
| 5,167,421 A | * | 12/1992 | Yunzhao | 297/216.18 |
| 5,449,218 A | * | 9/1995 | Beauvais et al. | 297/216.19 |
| 5,641,198 A | * | 6/1997 | Steffens, Jr. | 297/216.13 |
| 5,647,628 A | * | 7/1997 | Pires et al. | 296/68.1 |
| 5,664,830 A | * | 9/1997 | Garcia et al. | 297/216.11 |
| 6,149,232 A | * | 11/2000 | Meyer | 297/216.12 |

FOREIGN PATENT DOCUMENTS
WO    WO 0112464 A1 * 2/2001

* cited by examiner

*Primary Examiner* — Milton Nelson, Jr.

(57) ABSTRACT

A vehicle seat with that is movable in response to a collision that automatically shifts the position of an individual sitting the seat while having minimal change in the space behind the seat.

8 Claims, 2 Drawing Sheets

– 1 –
VEHICLE SAFETY SEAT

1. RELATED APPLICATION

This application claims priority and incorporates by reference the provisional patent application Ser. No. 60/961,024, filed on Jul. 18, 2007, titled "Vehicle Safety Seat" by Dennis Hawkins Hanson and Jennifer Lynn Hanson.

2. BACKGROUND OF THE INVENTION

Currently there are many vehicles, such as cars, buses, trains, boats and planes that are used daily. All of these vehicles have seats for the driver and passengers. The seats typically have been designed so that the bottom of the seat is fixed during an accident. Current approaches to improving vehicle safety with fixed seats involve air bags or other restraints to keep seat occupants in close proximity to the seats during an accident.

Some of the worst types of accidents that occur are head-on collisions. In a head-on collision, the driver and passengers are propelled forward by the sudden change in vehicle momentum and then thrown back by their reflexes. The spine and head of a person in a fixed seat are often in a position where the vector force of the weight of the upper body is supported by the "seat" portion of the vehicle seat. Such a position is likely to increase the likelihood of internal injuries in the head-on collision.

Therefore, there is a need for an approach to construct a safer vehicle seat that overcomes the limitations of known approaches.

SUMMARY

A vehicle safety seat is described that reduces chance of injury by changing the position of the person sitting in the seat portion in order to allow more of a person's body surface to absorb the impact. The vehicle safety seat having a seat portion and a base portion where the seat portion is in a first position on the base portion until an event occurs. Upon occurrence of the event, the seat portions changes from the first position to the second position. The second position enables the energy from the collision to be distributed over a greater area of the body, therefore allowing for less localized stress on the body.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

An approach for a vehicle safety seat for use in a vehicle that is able to change the position of an individual sitting in the vehicle seat in the event of an accident is being described.

Figure 1:
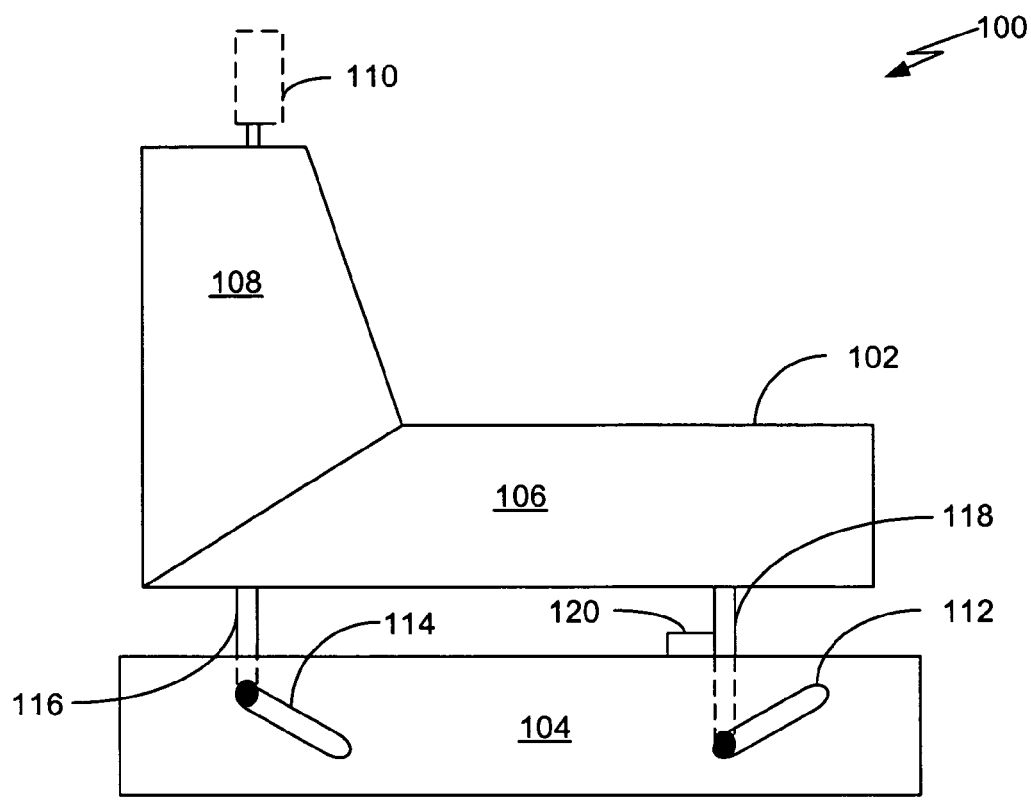
FIG. 1 is a side view of an example implementation of a vehicle safety seat with a seat portion in a first position and a base portion.

In FIG. 1, a side view 100 of an example implementation of the vehicle safety seat with a seat portion 102 in a first position and a base portion 104 is shown. The seat portion 102 is formed in such a way to provide a person with typical support when in a seated position with both a seat bottom 106 and seat back 108. Optionally, a head-rest 110 may be fixed on the seat back 108 to prevent a person's head from snapping back in the event of an accident.

The seat portion 102 may be spaced apart from the base portion by seat legs 116 and 118. The seat legs 116 and 118 are secured at one end to a sub-frame (now shown) of the seat bottom 106. The other end of the seat legs 116 and 118 are movably secured to the base portion 104. In other implementations, the seat portion may have telescoping legs (front, back, or both front and back) that may raise or lower the seat portion 102 between the first position and the second position.

In yet other implementations, airbags may be used within the seat to aid in absorbing impact forces. Similarly, airbags may be used to move the seat from its first position to its second position. Airbags may also be employed to collapse the seat in a controlled manner in order to further aid in the dispersion or reduction of impact forces.

The base portion 104 may form openings 112 and 114 that enable the legs 116 and 118 to be movably secured. The securing may occur with pins or rods through holes as shown in the example implementation of FIG. 1. In other implementations, bolts or other fasteners may be employed that enable the seat portion 102 to move relative to the base portion 104 in the event of an accident. In yet other implementation, the base portion 104 my have a track along which the seat portion travels.

A locking mechanism 120 or latch may be attached to base portion 104 to prevent premature changes of position and secure the seat portion 102 in the first position. The locking mechanism 120 may secure the seat portion 102 with a spring that requires a predetermined amount of force before it releases the seat portion 102. In yet other implementations, the locking mechanism may be an electro-mechanical mechanism controlled by the vehicle computer system that responds to crash sensors that trigger air bags.

Figure 2:
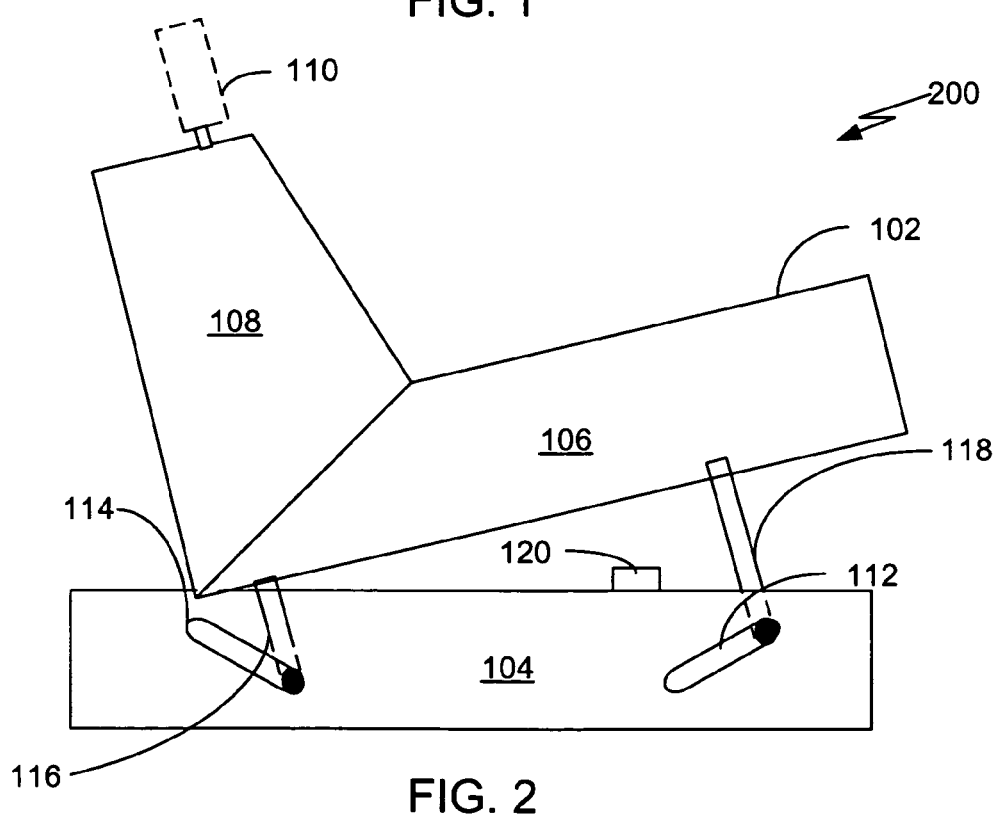
FIG. 2 is another side view of the example implementation of the vehicle safety seat with the seat portion in a second position

The seat portion 102 may be secured to the base portion 104 in a first position for normal operation or seating. Upon an event, such as an accident occurring, the locking mechanism 120 releases the seat portion 102 that moves to a second position. Turning to FIG. 2, another side view 200 of the example implementation of the vehicle safety seat with the seat portion 102 in a second position is shown. The seat back 108 is reclined in the second position in FIG. 2 compared to the first position of FIG. 1 and the seat bottom 108 is shown raised in FIG. 2 when compared to FIG. 1. One of the advantages to the seat portion having the seat back 108 drop and seat bottom 106 rise, is to allow the maximum change of angle in the least of amount of space. The seat portion may have an angle change from the first position to the second position of forty-five degrees. In other implementations, only the seat bottom or the seat back may move with the other seat portion only pivoting on the base portion 104. In yet other implementations, the base portion 104 may be installed on an incline with the front higher than the back.

Figure 3:
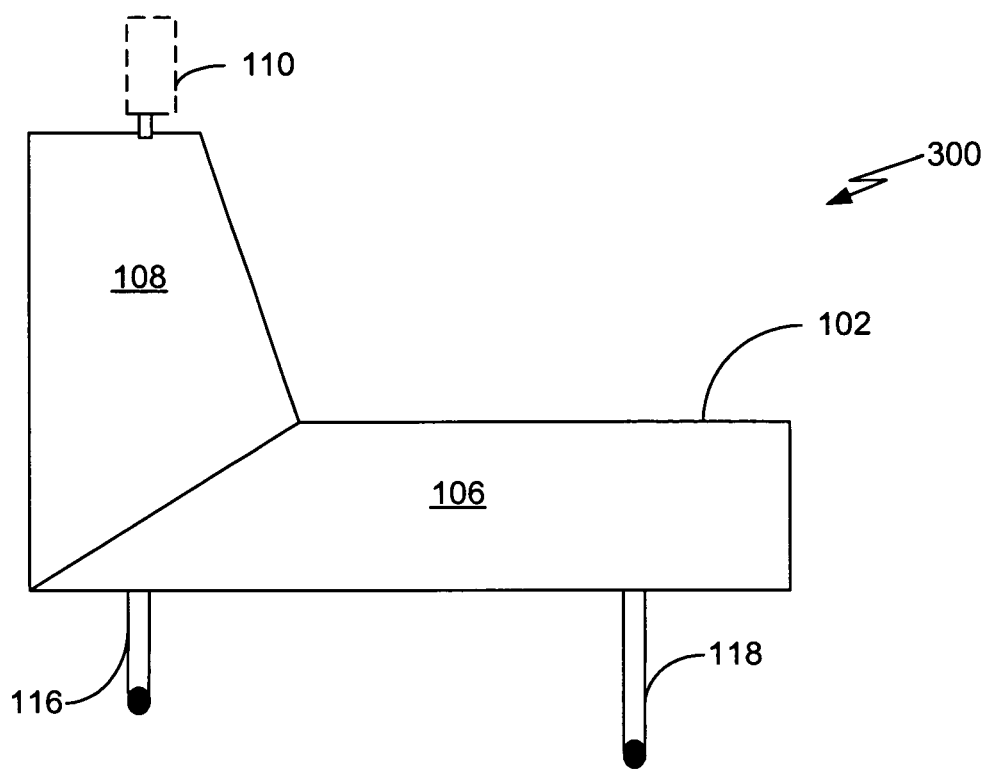
FIG. 3 is a side view of the seat portion.

In FIG. 3 a side view 300 of the seat portion 102 is shown. The legs 116 and 118 are depicted with leg 116 being shorter than leg 118. The difference in sizes of legs 116 and 118 enable the seat to be in the first position or a second reclined position. In other implementations, the legs 116 and 118 may be reversed. In yet other implementation, the holes formed in the base portion 104 may be offset enabling the legs to be the same length.

Figure 4:
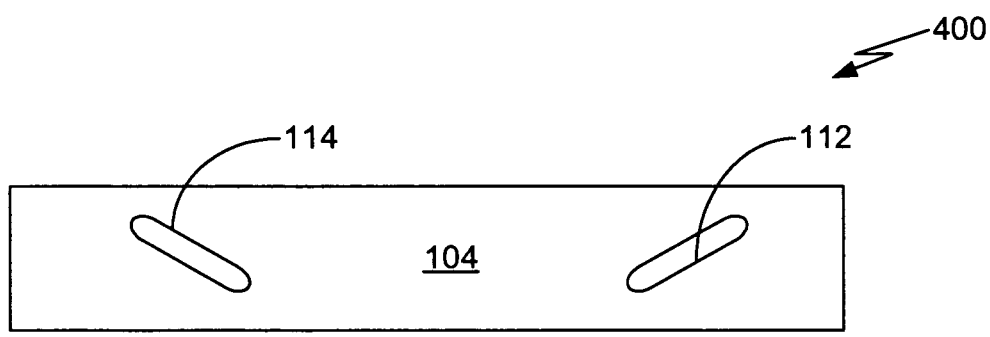
FIG. 4 is a side view of the base portion.

Turning to FIG. 4, a side view 400 of the base portion 104 is shown. The base portion 104 may be formed separate from the vehicle frame as shown in FIGS. 1, 2, and 4. In other implementations, the base portions may be formed in the body or frame of the vehicle. The base portion 104 may be made of iron, steel, aluminum, fiber carbon, or a composite material.

Figure 5:
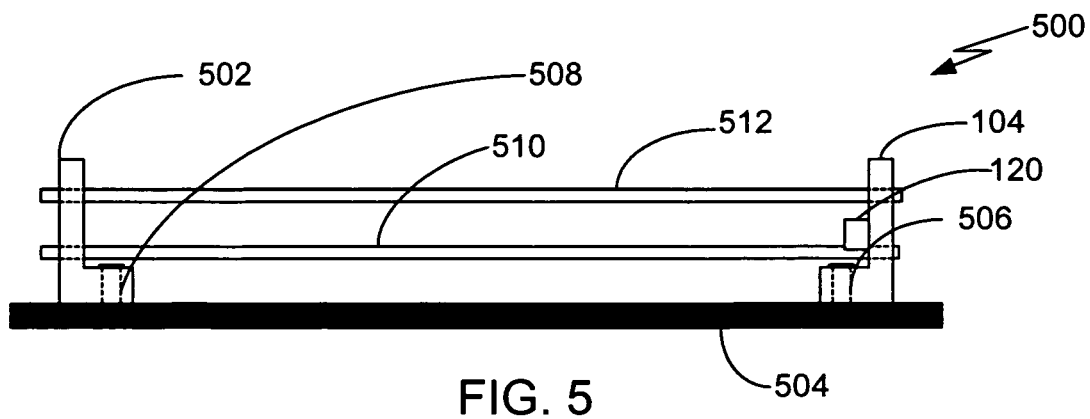
FIG. 5 is a front view of the base portions.

In FIG. 5, a front view of the base portion 104 along with base portion 502 is shown. The base portions 104 and 502 may be attached to the vehicle 504 with bolts 506 and 508. In other implementations, rivets, welds, stamped metal, screws or similar fasteners may be used to attach base portions 104 and 502 to vehicle 504. Rods 510 and 512 may pass through legs 116 and 118 and travel in slots 112 and 114. The rods 510 and 512 may be secured to legs 116 and 118 via welds or be molded with legs 116 and 118. In other implementations, the rods may be tabs that extend from legs 116 and 118 through base portions 104 and 502. The locking mechanism 120 may be on one base portion as shown in FIGS. 1, 2 and 5. In other implementations, the locking mechanism 120 may be located on the vehicle 504, rod 510 or 512. In yet other implementations, more than one locking mechanism 120 may secure the seat portion 102.

The foregoing description of an implementation has been presented for purposes of illustration and description. It is not exhaustive and does not limit the claimed inventions to the precise form disclosed. Modifications and variations are possible in light of the above description or may be acquired from practicing the invention. Note also that the implementation may vary between systems. The claims and their equivalents define the scope of the invention.

What is claimed is:

1. A vehicle seat, comprising:
   a seat portion having a seat bottom and a seat back;
   a base portion that supports the seat portion in a first position and a second position, where the support of the seat portion is located only at the seat bottom, where the base portion has at least a first enclosed channel at a first angle adapted to accept a first support affixed to the seat bottom of the seat portion and a second enclosed channel at a second angle different from the first angle, adapted to accept a second support affixed to the seat portion where the first support and the second support are of different lengths; and
   a locking mechanism that secures the seat portion in the first position until an event occurs wherein the locking mechanism enables the seat portion to change to a second position, where the event is rapid deceleration of the vehicle seat.

2. The vehicle seat of claim 1, where the locking mechanism is a sheer pin.

3. The vehicle seat of claim 1, where the locking mechanism is an electromechanical device activated by a crash sensor located in a vehicle.

4. The vehicle seat of claim 1, where the base portion is formed upon a floor of a vehicle.

5. A method of implementation of a vehicle safety seat, the method comprising:
   placing a seat portion upon a base portion in a first position, where support of the seat portion is located only under a bottom of the seat portion;
   securing the seat portion into the first position with a locking mechanism; and
   moving the seat portion from the first position to a second position upon the base portion in response to rapid deceleration of the vehicle where rapid deceleration results in release of the locking mechanism, where moving the seat includes movement of a first support affixed to the seat portion in at least a first enclosed channel at a first angle and movement of a second support affixed to the seat portion in at least a second enclosed channel formed in the base portion at a second angle where a first support and the second support are of different lengths.

6. The method of claim 5, where moving the seat includes shearing a pin in the locking mechanism.

7. The method of claim 5, where moving the seat includes activating an electromechanical device in the locking mechanism to free the seat portion in response to a crash sensor located in the vehicle.

8. The method of claim 5, where moving further includes, raising a front of the seat portion, and lowering the back of the seat portion.

* * * * *